United States Patent
Segal et al.

(10) Patent No.: US 11,893,117 B2
(45) Date of Patent: *Feb. 6, 2024

(54) SOFTWARE PACKAGE ANALYSIS FOR DETECTION OF MALICIOUS PROPERTIES

(71) Applicant: Twistlock Ltd., Herzliya (IL)

(72) Inventors: Ory Segal, Tel Aviv (IL); Yuri Shapira, Holon (IL); Avraham Shulman, Tel Aviv (IL); Benny Nissimov, Givatain (IL); Shaked Yosef Zin, Tel Aviv-Jaffa (IL)

(73) Assignee: Twistlock Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,250

(22) Filed: May 20, 2022

(65) Prior Publication Data
US 2022/0277081 A1    Sep. 1, 2022

Related U.S. Application Data

(63) Continuation of application No. 16/847,374, filed on Apr. 13, 2020, now Pat. No. 11,372,978.

(51) Int. Cl.
*G06F 21/56* (2013.01)
*G06F 21/57* (2013.01)
*G06F 21/53* (2013.01)

(52) U.S. Cl.
CPC ............ *G06F 21/572* (2013.01); *G06F 21/53* (2013.01); *G06F 21/566* (2013.01); *G06F 21/577* (2013.01); *G06F 2221/033* (2013.01)

(58) Field of Classification Search
CPC ...... G06F 21/572; G06F 21/53; G06F 21/566; G06F 21/577; G06F 2221/033
See application file for complete search history.

(56) References Cited

U.S. PATENT DOCUMENTS

| | | | |
|---|---|---|---|
| 10,019,572 B1 | 7/2018 | Mehr | |
| 2018/0025157 A1* | 1/2018 | Titonis | H04W 12/128 726/22 |
| 2018/0204003 A1* | 7/2018 | Adams | G06F 21/53 |

* cited by examiner

*Primary Examiner* — Izunna Okeke
(74) *Attorney, Agent, or Firm* — Gilliam IP PLLC (57) ABSTRACT

A system facilitates detection of malicious properties of software packages. A generic application which comprises known functionality into which a software package has been included is analyzed through a static analysis and/or dynamic analysis, which is performed based on executing the generic application in a controlled environment. The static analysis and/or dynamic analysis are performed to determine whether one or more properties associated with the software package comprise deviations from the known behavior of the generic application. Behavior deviations identified based on the static and/or dynamic analysis are associated with a score. An aggregate score is calculated for the software package based on the scores which have been assigned to the identified behavior deviations and may be adjusted based on a reputation multiplier determined based on metadata of the software package. If the aggregate score of the software package exceeds a score threshold, the software package is flagged as malicious.

20 Claims, 5 Drawing Sheets

SOFTWARE PACKAGE ANALYSIS FOR DETECTION OF MALICIOUS PROPERTIES

BACKGROUND

The disclosure generally relates to electric digital data processing and to security arrangements for protecting computers, components thereof, programs or data against unauthorized activity.

Applications often leverage functionality for which the underlying code units (e.g., single library files, a collection of library files, standalone routines and/or subroutines, etc.) are contained in software packages. To make code units contained in a software package available to an application, the software package is installed to a directory associated with the application. For instance, in the case of software packages which are open source, the software package can be downloaded from a software repository for installation of the package and its dependencies into a directory associated with the application by a package manager which handles package installation and dependency management. Software packages may comprise vulnerabilities, with lists of software packages known to have vulnerabilities and the affiliated package manager commonly published and updated as vulnerabilities are identified in new software packages. To identify whether a software package comprises a documented vulnerability, a vulnerability analysis of the application which includes the software project can be performed.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to analysis of software packages retrieved from a code repository which hosts open source software in illustrative examples. Aspects of this disclosure can be also applied to software packages retrieved from other sources, such as closed source (i.e., proprietary) software packages and packages retrieved from cloud-based repositories. In other instances, well-known instruction instances, protocols, structures and techniques have not been shown in detail in order not to obfuscate the description.

Overview

The integration of unknown software packages (also referred to herein as "packages"), particularly those developed by third parties, into an application poses a risk that the software packages are malicious or include vulnerabilities. While software packages known to include vulnerabilities can be identified through vulnerability assessment, an as of yet unassessed software package may comprise program code which is linked to unknown or potentially malicious behavior that is not associated with a documented vulnerability. Because the unknown or potentially malicious behavior lacks association with a documented vulnerability, the behavior will go undetected through conventional vulnerability assessment techniques. As a result, code units included in a software package which an application relies upon may be malicious or contribute to otherwise undesirable behavior, such as data exfiltration, execution of unsafe functions (e.g., eval), or access of environment variables, that is not discovered until the application has been deployed.

To provide developers with an assessment of trustworthiness of unknown software packages and detect those which are malicious before the software packages are integrated into an application, a system for software package evaluation has been developed to facilitate detection of malicious properties of software packages. A generic application into which a software package of interest has been included is analyzed, where the analysis of the generic software application includes a static analysis and/or a dynamic analysis performed based on executing the generic application in a controlled environment (e.g., a sandbox). Analysis results which are attributable to the software package can be recognized because functionality of the generic application and therefore the expected analysis results are known prior to integration of the software package. The static analysis and/or dynamic analysis are performed to determine whether one or more properties associated with the software package are potentially malicious or otherwise undesirable. A set of rules for identification of potentially malicious properties can be established, where each rule for identifying a potentially malicious property may indicate the behavior(s) resulting from inclusion of the software package in the generic application which are indicative that the software package possesses the property. The behavior(s) can be reflected in the source code of the generic application evaluated during the static analysis and/or reflected in behavior patterns of the generic application evaluated during the dynamic analysis.

Properties of the software package which are potentially associated with malicious behavior identified based on the static and/or dynamic analysis, such as based on determining that one or more of the rules have been satisfied, are associated with a score. The score assigned to each property can be determined based on a type of the property or a severity classification of the property, for example. An aggregate score is calculated for the software package based on the scores which have been assigned to the identified properties, where the aggregate score may be adjusted based on a reputation multiplier determined based on metadata of the software package. If the aggregate score of the software package exceeds a score threshold, the software package is flagged as malicious. The score report generated for the software package may be stored in a score report repository for subsequent access by developers considering use of the software package. Software packages determined to be malicious that may otherwise be undetected by a conventional vulnerability assessment can thus be identified early in the application development process before an application in which the software packages are included is deployed.

Example Illustrations

Figure 1:
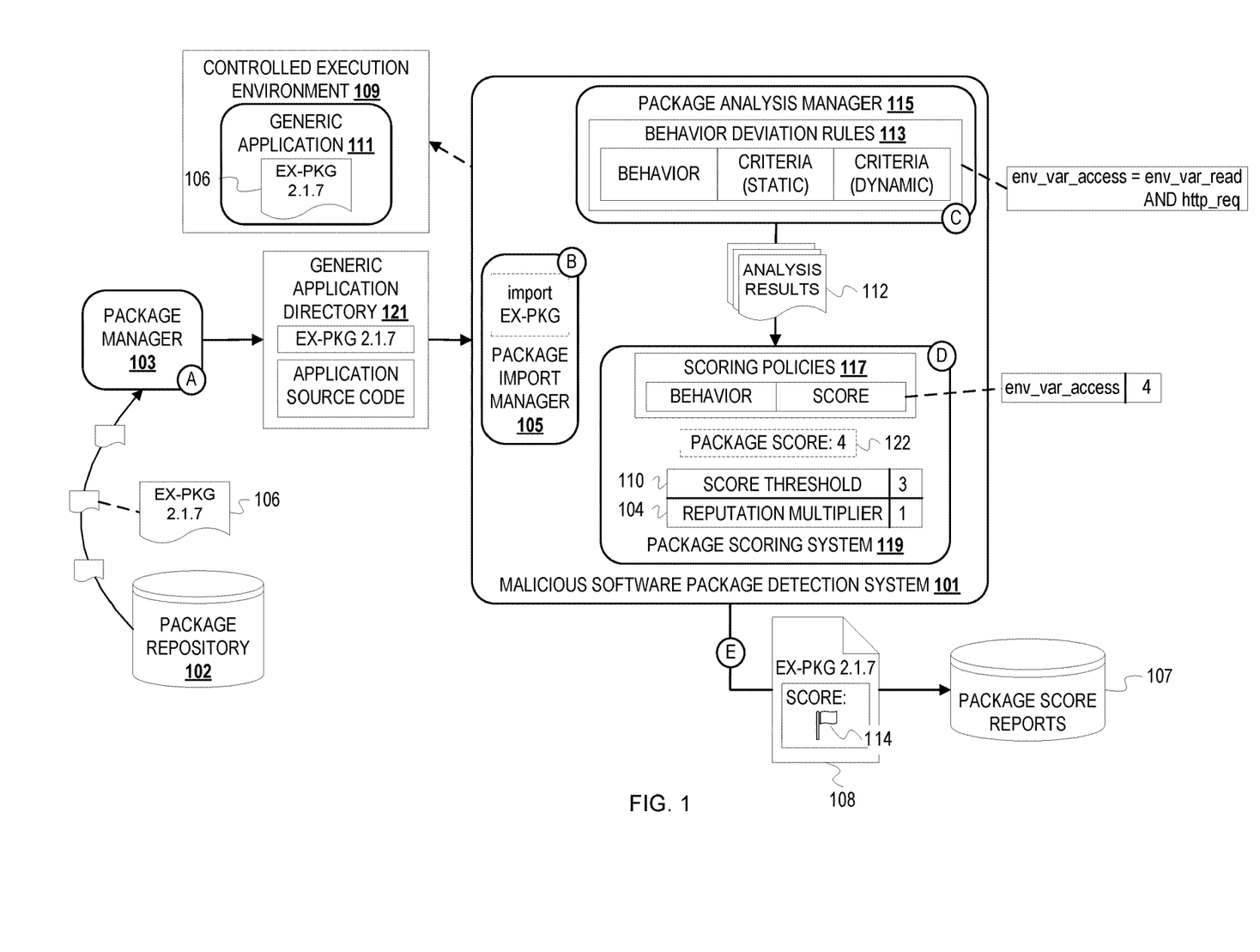
FIG. 1 depicts a conceptual diagram of malicious package detection based on associating software packages with a generic application for analysis.

FIG. 1 depicts a conceptual diagram of malicious package detection based on associating software packages with a generic application for analysis. FIG. 1 depicts a malicious software package detection system ("detection system") 101. The detection system 101 analyzes unknown packages to determine whether the packages are malicious prior to inclusion of the packages in a target application. FIG. 1 also depicts a generic application 111. The generic application 111 is a "generic" application because it has generic functionality which is known prior to the analysis by the detection system 101 and is associated with known behaviors. The detection system 101 includes a package import manager 105, a package analysis manager 115, and a package scoring system 119. The package import manager 105 handles association of packages with the generic application 111. The package analysis manager 115 performs a static analysis of a package and/or a dynamic analysis of the generic application 111 after a package has been included in the generic application 111. The package scoring system 119 computes a score of a package indicative of package trustworthiness based on results of the static analysis and/or dynamic analysis to determine whether the package is malicious.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, a package manager 103 installs a package 106 in the directory 121. The package manager 103 handles package installation and dependency management for packages which the detection system 101 retrieves (e.g., downloads) from a package repository 102. The package repository 102 is a software repository which stores packages and may be a repository for open source software. The malicious package detection system 101 can initiate a download of available packages from the package repository 102 by leveraging an application programming interface (API) or other interface provided by the package repository 102 for download and installation of packages. The package manager 103 installs the packages specified for download which at least includes the package 106. The package manager 103 installs the package 106 into a directory 121 which has been created for the generic application 111. The directory 121 comprises application files associated with the generic application 111, such as source code files, executables, or other resources and assets of the generic application 111. Installation of the package 106 in the directory 121 makes code units of the package 106 accessible to the generic application 111.

At stage B, after launch of a controlled execution environment 109 for execution of the generic application 111 the package import manager 105 imports the package 106 into the generic application 111. The controlled execution environment 109 can be any controlled environment provided for execution of an application which can monitor process execution, file system access, attempted network connections, etc. For instance, the controlled execution environment 109 may comprise a sandbox. The package import manager 105 manages inclusion of packages in the generic application 111 based on package type (i.e., programming language). In this example, for the language associated with the package 106, packages are included in an application through an import operation that is implemented with an import statement. The package import manager 105 can dynamically import the package 106 into the generic application 111 via an import statement. As another example, the controlled execution environment 109 may comprise functionality for dynamically importing packages. In this case, the package import manager 105 can configure the controlled execution environment 109 to import the package 106 (e.g., based on a name of the package 106 indicated in package metadata). While FIG. 1 depicts the package import manager 105 as dynamically including the package 106 via an import statement, other techniques may be leveraged for including packages of other types (e.g., with a "require" statement for packages written in the JavaScript® programming language). Because the import of the package 106 is dynamic, the controlled execution environment 109 can monitor and record behavior which follows from the import of the package 106.

At stage C, the package analysis manager 115 analyzes the generic application 111 in which the package 106 has been imported to generate analysis results 112. The package analysis manager 115 analyzes the package 106 by performing a security analysis. The security analysis can comprise a static analysis of the package 106 and/or a dynamic analysis of the generic application 111 based on executing the generic application 111 in the controlled execution environment 109 and monitoring its execution. Because the functionality of the generic application 111 is generic and its behavior is known, dynamic analysis results which are attributable to the package 106 can be distinguished from dynamic analysis results which are attributable to the generic application 111 alone. In this example, the package analysis manager 115 performs a static analysis of the package 106 in addition to a dynamic analysis. The package analysis manager 115 detects deviations from the known behavior of the generic application 111 attributable to the package 106 through the static analysis and dynamic analysis based on behavior deviation rules ("rules") 113. The rules 113 comprise rules for detecting behaviors which deviate from the known behavior of the generic application 111, hereinafter referred to as "behavior deviations," based on one or more criteria for code patterns identified as a result of static analysis and execution/behavior patterns identified as a result of execution of the generic application 111 within the controlled execution environment 109 for the dynamic analysis. In this example, the rules 113 at least include a rule for detecting a behavior deviation of unauthorized access to environment variables based on identifying a read operation of an environment variable and a subsequent Hypertext Transfer Protocol (HTTP) request (e.g., an HTTP PUT request to an external server which includes the value of the environment variable as a payload). While FIG. 1 depicts the rules 113 as specifying criteria for both static analysis results and dynamic analysis results, the package analysis manager 115 may maintain separate sets of rules indicating the properties and respective criteria for each of the static analysis results and dynamic analysis results.

The package analysis manager 115 performs the dynamic analysis of the generic application 111 based on execution of the generic application in the controlled execution environment 109. The generic application 111 can execute in the controlled execution environment 109 for a configurable time period following the import of the package 106. One or more test cases for invoking functionality of the package 106 may also be executed within the controlled execution environment 109. For instance, the generic application 111 can include program code for calling functions provided by the package 106, instantiating classes defined by code units of the package 106, etc., through reflective programming. The controlled execution environment 109 monitors and records the execution of the generic application 111 to generate execution results which indicate behavior patterns of the generic application 111 within the controlled execution environment 109. The package analysis manager 115 evaluates behavior patterns of the generic application 111 observed during execution against the rules 113 based on the dynamic analysis criteria. For instance, the package analysis manager 115 can evaluate behavior patterns of the generic application 111 indicated in the execution results against the behavior patterns indicated in the dynamic analysis criteria of the rules 113 to determine whether the behavior patterns match and thus satisfy a respective one of the rules 113.

The package analysis manager also performs the static analysis of the package 106 to identify code patterns of the package 106 associated with behavior deviations. The package analysis manager 115 evaluates code patterns against the static analysis criteria indicated in the rules 113. For instance, the package analysis manager 115 can evaluate code patterns present in code units of the package 106 against the rules 113 based on code patterns indicated in the static analysis criteria to determine whether the code patterns match and thus satisfy a respective one of the rules 113.

If the package analysis manager 115 determines that both the static analysis criteria and dynamic analysis criteria are satisfied for one or more of the rules 113, the package analysis manager 115 records an indication of the behavior deviation corresponding to the respective rule(s) of the rules 113 to the analysis results 112. The analysis results 112 indicate the behavior deviations which were identified for the package 106 through the static analysis and dynamic analysis. If the criteria indicated in the rules 113 are satisfied from results of one of the analyses rather than both analyses (i.e., static analysis or dynamic analysis), the package analysis manager 115 may add the corresponding behavior deviation property to the analysis results 112 with an indicator of which of the two analyses resulted in the positive identification of the behavior deviation. In this example, the package analysis manager 115 determines as a result of the static analysis and dynamic analysis that the package 106 comprises an implementation of unauthorized access to environment variables based on identifying a read operation of an environment variable and a subsequent HTTP request issued to an external server. The package analysis manager 115 thus adds an indication of the behavior of unauthorized access to environment variables to the analysis results 112.

At stage D, the package scoring system 119 determines a score 122 for the package 106 based on the analysis results 112. Scoring policies corresponding to one or more package types can be attached to (i.e., installed on or otherwise accessible to) the package scoring system 119. The package scoring system 119 accesses scoring policies 117 which correspond to the type of the package 106. The scoring policies 117 indicate behaviors which may be associated with packages that correspond to the behavior deviations specified by the rules 113 and a score assigned to each behavior. In this example, the scoring policies 117 indicate at least a first policy which identifies unauthorized access to environment variables as behavior that is assigned a score of four. The package scoring system 119 evaluates the analysis results 112 to determine the behavior deviations which were identified for the package 106 as a result of the static analysis and dynamic analysis. The package scoring system 119 can then determine the score which has been assigned to each of the behavior deviations identified for the package 106 based on the scoring policies 117.

The package scoring system 119 determines the score 122 for the package based on the evaluation of the analysis results 112 in view of the scoring policies 117. The score 122 is an aggregate score which indicates trustworthiness of the package 106 that is determined from the scores assigned to each of the behavior deviations in the scoring policies 117. For example, the score 122 may be a sum of the scores assigned to each of the behavior deviations identified for the package 106. The score 122 may also be adjusted based on a reputation multiplier. In this example, the package scoring system 119 adjusts the score 122 based on a reputation multiplier 104. The reputation multiplier 104 is based on a "reputation" of the package 106 which can be determined from metadata of the package 106 (e.g., number of downloads, release date, etc.). For instance, an additional set of policies for determining a reputation multiplier may be attached to the package scoring system 119 which indicate one or more reputation multiplier values and associated criteria for package metadata. The package scoring system 119 can then select a reputation multiplier for trust score adjustment based on evaluating metadata of the package 106. In this example, the reputation multiplier 104 has a value of one and does not impact the score 122. The package scoring system 119 determines whether the package 106 is malicious based on evaluating the score 122 against a score threshold 110. The package scoring system 119 can detect malicious packages based on package scores satisfying the score threshold 110. In this example, the package scoring system 119 determines that the score 122 satisfies the score threshold 110 and thus identifies the package 106 as a malicious package.

At stage E, the detection system 101 generates a report 108 for the package 106 for storage in a repository 107 of package score reports (hereinafter "score report repository 107"). The report 108 may indicate the score 122 calculated for the package 106 and/or the analysis results 112. The report 108 also includes a flag 114 to denote that the package 106 was determined to be malicious. The detection system 101 stores the report 108 in the score report repository 107. Package score reports such as the report 108 can subsequently be accessed for reference based on querying the score report repository 107, by leveraging an API provided by the score report repository 107 for accessing score reports, etc. For instance, the score report repository 107 may be indexed by package name and version number for retrieval of score reports. Developers can thus access the score report repository 107 to obtain a score report generated for an unknown package, such as the report 108 for the package 106, prior to integrating the package with a target application.

Figure 2:
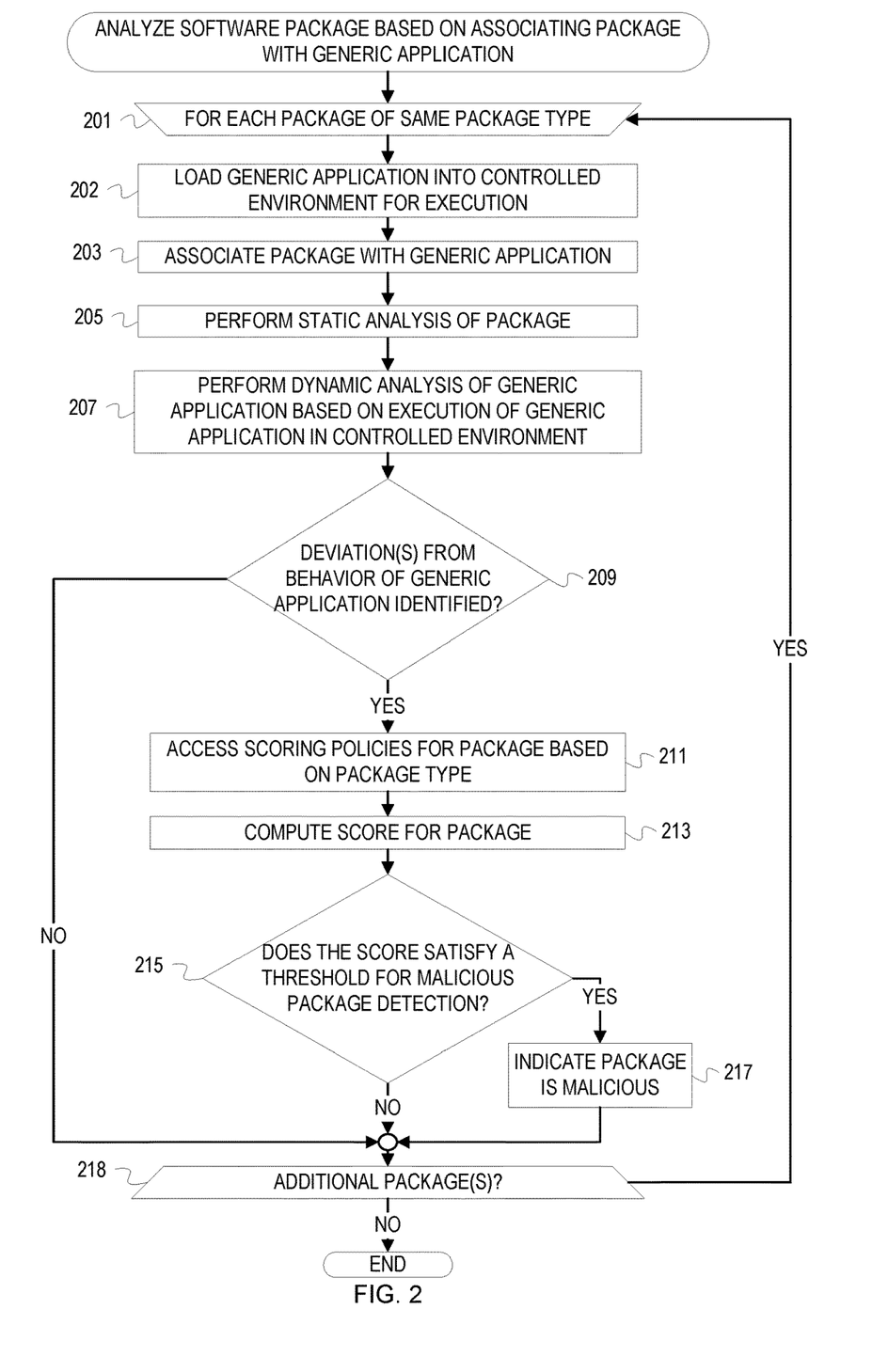
FIG. 2 depicts a flowchart of example operations for analyzing a software package based on associating the software package with a generic application.

FIG. 2 depicts a flowchart of example operations for analyzing a software package based on associating the software package with a generic application. The example operations are described with reference to a malicious software package detection system (hereinafter "detection system") for consistency with FIG. 1. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. While the example operations describe performing a static analysis of a package and a dynamic analysis of a generic application with which the package has been associated, the static analysis can be performed based on accessibility of the package source code to the detection system. For instance, in some implementations, the detection system may analyze a package through dynamic analysis rather than static analysis and dynamic analysis. The depicted operations occur after the detection system has obtained one or more packages for analysis. For instance, packages can be obtained from a software repository, such as a repository which hosts open source software projects or a cloud-based repository, obtained based on download and installation of a package file, etc.

At block 201, the detection system begins analysis of each package of a same package type. Package type can be determined based on a programming language associated with a package and/or the source of the packages. For instance, the detection system can analyze each JavaScript package which was retrieved from a repository which stores JavaScript packages, each package written in the Java® programming language retrieved from a repository which stores Java packages, etc.

At block 202, the detection system loads a generic application into a controlled environment for execution. The detection system loads the generic application into a controlled environment for execution to facilitate analysis of potentially malicious packages. For instance, the detection system can load the generic application into a sandbox which was launched for executing the generic application.

At block 203, the detection system associates the package with the generic application. The detection system can associate the package with the generic application dynamically. For instance, the detection system may configure the controlled environment in which the generic application executes to dynamically import the package. The package is associated with the generic application based on the type of the package. Examples of association of the package with the generic application based on package type include executing a "require" script for JavaScript packages and executing an "import" statement for Java packages. The controlled execution environment then monitors execution of the generic application based on the association of the package with the generic application. Because behaviors associated with the package may be performed upon import of the package, execution of the generic application can be monitored for a configurable time period after the dynamic import of the package and the results recorded, such as in a log. Alternatively or in addition, the generic application may implement reflective programming to manipulate the functionality of the package. For instance, the generic application can comprise program code for instantiating classes of the package and/or for invoking functions/methods of the package. Execution of the generic application and the associated behaviors which result from invoking package functionality through reflection can thus be monitored following the association of the package with the generic application.

At block 205, the detection system performs a static analysis of the package. The detection system performs a static analysis of the package based on a set of one or more rules for identifying behavior deviations to determine whether the package comprises code patterns that are indicative of behavior deviations (e.g., potentially malicious or otherwise unwanted activity). For instance, the detection system may analyze the package through pattern-based static analysis. Each rule against which code patterns of the package are evaluated may indicate a behavior deviation and at least a first criterion for a code pattern to satisfy the rule for detecting the behavior deviation. The static analysis results may thus indicate behavior deviations which were identified based on code patterns observed for the package satisfying a respective one of the rules.

At block 207, the detection system performs a dynamic analysis of the generic application with which the package has been associated based on execution of the generic application in the controlled environment. The detection system performs a dynamic analysis of the generic application based on the results of executing the generic application in the controlled environment and the controlled environment monitoring the execution. For instance, the detection system can maintain one or more rules which indicate a behavior deviation and at least a first criterion for a behavior pattern to satisfy the rule for detecting the behavior deviation. The detection system can evaluate behavior patterns recorded during execution of the generic application (e.g., recorded in a sandbox log) against the rules. The dynamic analysis results thus indicate behavior deviations which were identified based on behavior patterns observed for the generic application satisfying a respective one of the rules based on associating the package with the generic application.

At block 209, the detection system determines whether one or more deviations from behavior of the generic application were identified as a result of the static analysis and dynamic analysis. Behavior deviations are behaviors which are attributable to the package as a result of associating the package with the generic application. The detection system determines if one or more behavior deviations were identified based on whether the static analysis results and dynamic analysis results indicate one or more code patterns and/or behavior patterns associated with the package which satisfied a rule for identifying behavior deviations. If one or more behavior deviations were identified, operations continue at block 211. If no behavior deviations were identified, operations continue at block 218.

At block 211, the detection system accesses scoring policies for the package based on the package type. The detection system can maintain scoring policies for a plurality of package types. The detection system determines the package scoring policies to be leveraged for package evaluation based on the type of package currently being evaluated. For instance, the detection system can access the scoring policies maintained for the programming language of the package.

At block 213, the detection system computes a score for the package. The detection system computes a score for the package based on the behavior deviations which were identified for the package as a result of the static analysis and dynamic analysis. The detection system can maintain scoring policies which indicate behavior deviations that may be identified for a package and a score corresponding to each behavior deviation. Scoring policies may be maintained for each package type. The detection system determines an aggregate score based on the scores assigned to each of the behavior deviations indicated in the results of the static analysis and dynamic analysis (e.g., a sum of the scores). Determination of a package score is further described in reference to FIG. 3.

At block 215, the detection system determines whether the score satisfies a threshold for malicious package detection. The detection system maintains a threshold for package scores which, if satisfied, triggers the detection system to indicate that a package qualifies as malicious. The threshold against which the detection system evaluates the package score may also be determined based on the type of the package. If the score satisfies the score threshold, operations continue at block 217. If the score does not satisfy the score threshold, operations continue at block 218.

At block 217, the detection system indicates that the package is malicious. For instance, the detection system can generate a report, notification, etc. which identifies the package at least by name and version number and indicates the package score. The detection system may store results of the analysis of the package in a repository for subsequent access. As an example, a report which includes the package score, the identified behavior deviations, and an indication of whether the package was determined to be malicious may be generated and/or stored in a repository for score reports.

At block 218, operations continue depending on whether one or more packages remain for analysis. If one or more packages remain for analysis, operations continue at block 201. If there are no packages remaining, operations are complete.

Figure 3:
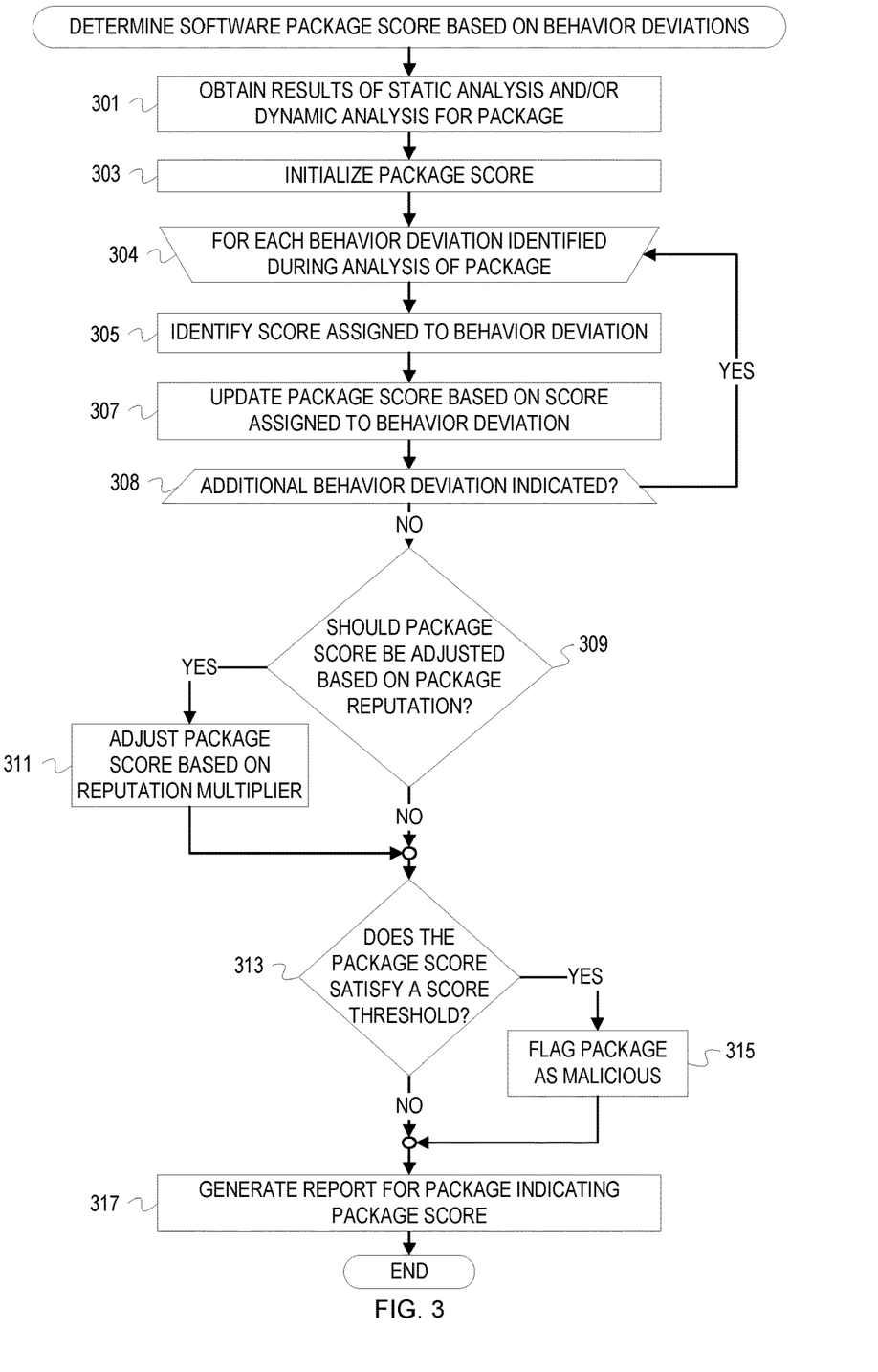
FIG. 3 depicts a flowchart of example operations for determining a score which represents trustworthiness of a software package based on behaviors associated with the software package.

FIG. 3 depicts a flowchart of example operations for determining a score which represents trustworthiness of a software package based on behaviors associated with the software package. The example operations are described with reference to a malicious software package detection system (hereinafter "detection system") for consistency with FIG. 1. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 301, the detection system obtains results of static analysis and/or dynamic analysis for a package. The results indicate behavior deviations associated with a package which were identified based on static analysis of the package and/or dynamic analysis of an application associated with known behavior with which the package was associated.

At block 303, the detection system initializes a package score. The package score is an aggregate score indicative of trustworthiness of the package which is computed based on individual scores assigned to the behavior deviations identified for the package. For instance, the detection system can initialize the package score to zero.

At block 304, the detection system begins computing the package score based on each behavior deviation identified from the analysis of the package. Each of the behavior deviations are associated with a score. For instance, the detection system can maintain scoring policies for each package type which indicate behavior deviations which may be identified and the score which has been assigned to each behavior deviation. The detection system computes the package score based on the scoring policies.

At block 305, the detection system identifies a score assigned to the behavior deviation. The detection system determines the score which corresponds to the behavior deviation based on the scoring policies. Scores may be assigned according to a type of behavior deviation and/or a severity of the behavior deviation, where higher scores are assigned to behavior deviations with a potentially higher impact or severity.

At block 307, the detection system updates the package score based on the score assigned to the behavior deviation. For instance, the detection system can update the package score by adding the score assigned to the behavior deviation to the package score.

At block 308, the detection system determines if an additional behavior deviation is indicated in the results of the static analysis and/or dynamic analysis. If an additional behavior deviation is indicated, operations continue at block 304. If no additional behavior deviations are indicated, operations continue at block 309.

At block 309, the detection system determines whether the package score should be adjusted based on a reputation of the package. The package score may be adjusted based on package metadata related to "reputation" of the package. Examples of package metadata which relates to reputation includes release date and number of downloads or users. The detection system can maintain policies for determining a reputation multiplier against which package metadata are evaluated for selection of a reputation multiplier. Package scores for "reputable" packages may be adjusted with a reputation multiplier which is a decimal value to reduce false positives. For instance, packages with a high number of downloads and an older release date may have a lower likelihood of comprising malicious behavior than newer packages with fewer downloads. A package which is reputable as indicated by the reputation policies may thus be adjusted with a reputation multiplier such as 0.8, while the package score for a package with no reputation will remain unchanged. If the package score should be adjusted, operations continue at block 311. If the package score should not be adjusted, operations continue at block 313.

At block 311, the detection system adjusts the package score based on the reputation multiplier. The detection system can adjust the package score by multiplying the package score and the reputation multiplier.

At block 313, the detection system determines whether the package score satisfies a score threshold. The detection system maintains a threshold against which package scores are evaluated to determine whether a package is malicious. Packages for which the package score satisfies the threshold can be flagged as malicious. If the package score satisfies the threshold, operations continue at block 315. If the package score does not satisfy the threshold, operations continue at block 317.

At block 315, the detection system flags the package as malicious. The detection system generates an indication that the package is malicious to facilitate subsequent identification of the package as malicious. For instance, the detection system may associate a label, tag, etc. with the package indicating that the package is malicious and/or add the indication that the package to a report generated for the package.

At block 317, the detection system generates a report for the package which indicates the package score. The report generated for the package indicates results of the analysis of the package, such as the package score and behavior deviations identified for the package. If the detection system determined that the score computed for the package satisfied the threshold for malicious package detection, the report may indicate that the detection system flagged the package as malicious. Otherwise, if the score computed for the package did not satisfy the threshold, the report may indicate that the package can be used at a developer's discretion. Reports indicating the package score can be communicated in a notification and/or stored in a repository indexed by package name and version number for subsequent access.

Figure 4:
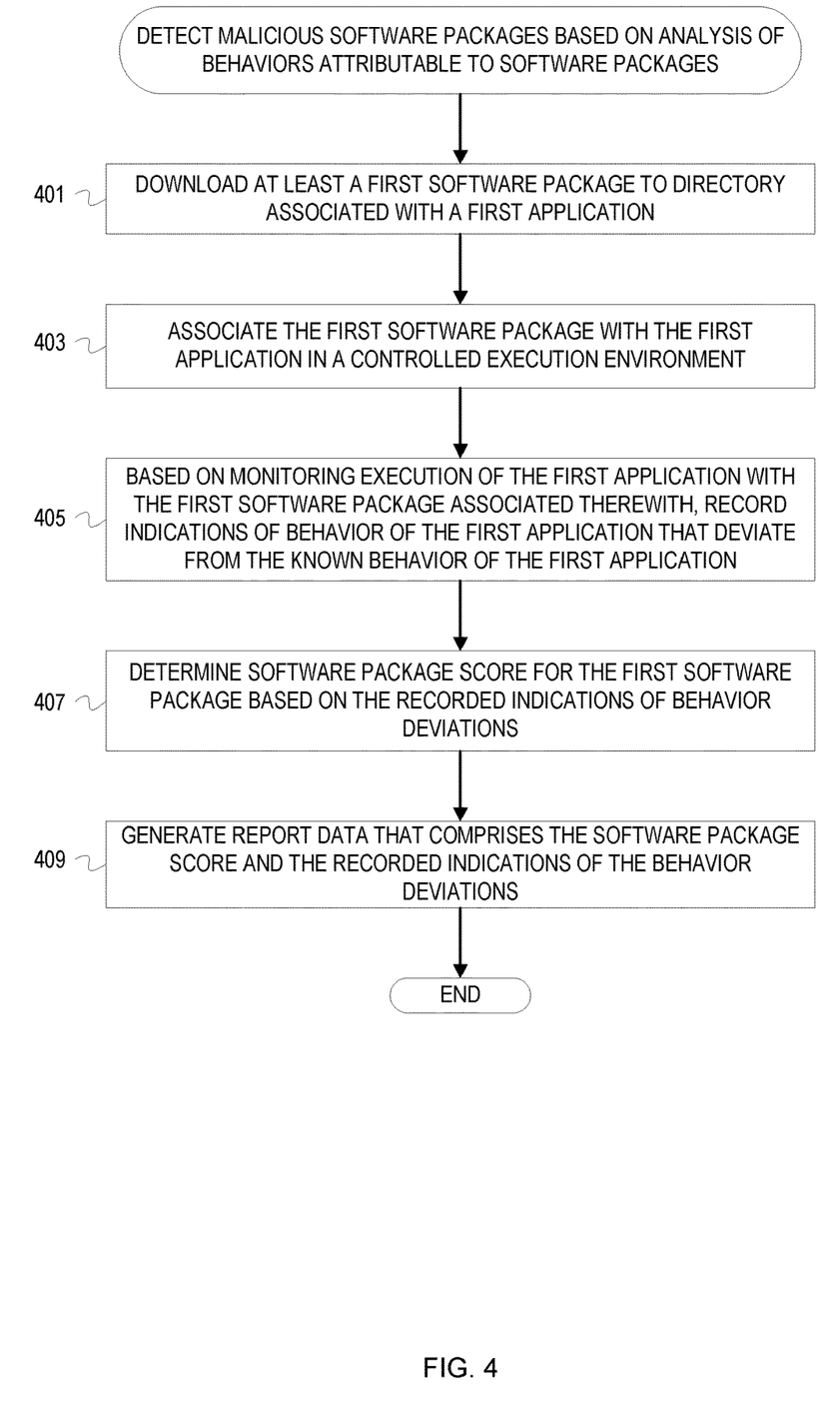
FIG. 4 depicts a flowchart of example operations for detecting malicious software packages based on analysis of behavior associated with software packages.

FIG. 4 depicts a flowchart of example operations for detecting malicious software packages based on analysis of behaviors attributable to a software package. The example operations are described with reference to a malicious software package detection system (hereinafter "detection system") for consistency with FIG. 1. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 401, the detection system downloads at least a first software package to a directory associated with a first application. The first application comprises "generic" functionality which is associated with known/expected behaviors before association with the first software package. The detection system can download the first package from a code repository, such as a code repository which hosts open source software projects, a cloud-based repository, etc. As another example, the detection system can download a package file which comprises the first package.

At block 403, the detection system associates the first software package with the first application in a controlled execution environment. The controlled execution environment is any controlled environment in which the first application can be executed and monitored during execution, such as a sandbox. The detection system associates the first software package with the first application based on the type of the first software package (i.e., programming language and/or source of the package). For instance, the detection system can configure the controlled execution environment to dynamically import the first software package into the first software application.

At block 405, based on monitoring execution of the first application with the first software package associated therewith, the detection system records indications of behavior of the first application that deviate from the known behavior of the first application. For instance, the detection system can maintain rules for identifying behavior deviations against which indications of behaviors observed as a result of monitoring execution of the first application are evaluated. The detection system records the indications of behaviors which satisfy a rule for identifying a behavior deviation.

At block 407, the detection system determines a software package score for the first software package based on the recorded indications of behavior deviations. The detection system can maintain one or more policies for determining a software package score based on identified behavior deviations, where policies may correspond to package type. The policies comprise potential behavior deviations and the score associated with each behavior deviation. The detection system evaluates the recorded indications of behavior deviations against the scoring policy corresponding to the type of the first software package to compute the software package score, where the software package score is an aggregate of the scores associated with each of the recorded indications of behavior deviations (e.g., a sum).

At block 409, the detection system generates report data that comprises the software package score and the recorded indications of the behavior deviations. The detection system generates report data for the first software package which at least indicates the software package score and the behavior deviations which contributed to the determination of the software package score. The report data may also indicate whether the software package is malicious based on comparison of the software package score with a score threshold for detection of malicious software packages. The report data generated for the first software package can be stored in a repository for subsequent access. For instance, the report data may be stored in a software package report repository which is indexed by software package name and version number.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 205 and 207 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Figure 5:
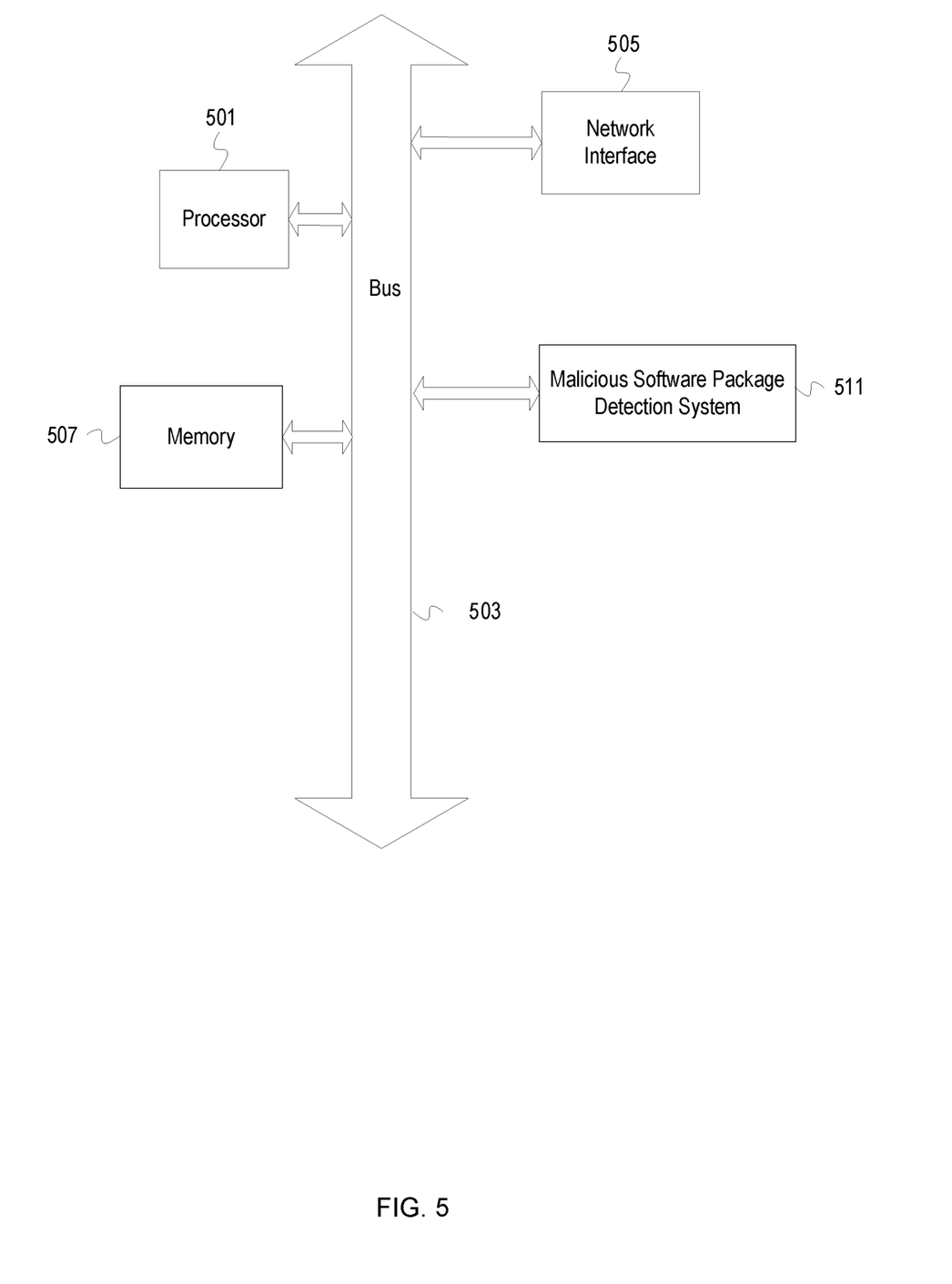
FIG. 5 depicts an example computer system with a malicious software package detection system.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

FIG. 5 depicts an example computer system with a malicious software package detection system. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes malicious software package detection system 511. The malicious software package detection system 511 analyzes unknown software packages based on static analysis and/or dynamic analysis of a generic application with which the software packages are associated to determine whether the software packages are malicious. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

While the aspects of the disclosure are described with reference to various implementations and exploitations, it will be understood that these aspects are illustrative and that the scope of the claims is not limited to them. In general, techniques for detecting malicious software packages based on static analysis and/or dynamic analysis as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    loading a first application with known behavior into a controlled execution environment;
    importing a software package into the first application;
    based on first criteria for detecting behaviors that deviate from the known behavior of the first application, evaluating behavior patterns recorded during execution of the loaded first application having the imported software package;
    based on determining that one or more behaviors recorded in the behavior patterns satisfy one or more of the first criteria, determining that the one or more behaviors correspond to deviations from the known behavior of the first application and are attributable to the software package;
    computing a score indicative of trustworthiness of the software package based on scores assigned to the one or more behaviors; and
    based on evaluating the score computed for the software package, determining that the software package is malicious.

2. The method of claim 1 further comprising performing a static analysis of the first application having the software package imported, wherein determining that the one or more behaviors correspond to deviations from the known behavior of the first application is also based on results of performing the static analysis.

3. The method of claim 1, wherein evaluating the score comprises evaluating the score against a threshold, and wherein determining that the software package is malicious comprises determining that the score satisfies the threshold.

4. The method of claim 1, wherein importing the software package comprises importing the software package based on a type of the software package.

5. The method of claim 1 further comprising generating a report comprising at least one of the score computed for the software package, indications of the one or more behaviors, and an indication that the software package is malicious.

6. The method of claim 5 further comprising storing the report in a repository of reports generated for software packages, wherein the repository is indexed by at least one of software package name and software package version number.

7. The method of claim 1, wherein computing the score comprises determining the scores assigned to each of the one or more behaviors and aggregating the scores assigned to each of the one or more behaviors.

8. The method of claim 1 further comprising adjusting the score based on a reputation multiplier, and wherein evaluating the score computed for the software package comprises evaluating the adjusted score.

9. The method of claim 8, wherein the reputation multiplier is determined based on metadata of the software package.

10. One or more non-transitory computer-readable media having program code stored thereon that is executable by a computing device, the program code comprising instructions to:
    load a first application with known behavior into a controlled execution environment;
    associate a software package with the first application in the controlled execution environment;
    based on a plurality of rules for detecting deviations in behavior from the known behavior of the first application, evaluate behavior patterns observed during execution of the loaded first application with the associated software package;
    based on a determination that one or more of the behavior patterns satisfy corresponding ones of the plurality of rules, determine that the one or more behavior patterns correspond to one or more behaviors that deviate from the known behavior of the first application and are attributable to the software package;

compute a score for the software package based on scores assigned to the one or more behaviors that deviated from the known behavior; and determine whether the software package is malicious based on evaluation of the score computed for the software package.

11. The non-transitory computer-readable media of claim 10, wherein the program code further comprises instructions to perform a static analysis of the first application with the software package associated and determine that a first code pattern identified in results of the static analysis corresponds to a first behavior that deviates from the known behavior of the first application.

12. The non-transitory computer-readable media of claim 10, wherein the instructions for the evaluation of the score comprise instructions to evaluate the score against a threshold, and wherein the instructions to determine that the software package is malicious comprise instructions to determine that the score satisfies the threshold.

13. The non-transitory computer-readable media of claim 10, wherein the instructions to compute the score comprise instructions to determine the scores assigned to the one or more behaviors and aggregate the determined scores, wherein the evaluation of the score comprises an evaluation of the aggregate of the determined scores.

14. An apparatus comprising:
a processor; and
a computer-readable medium having instructions stored thereon that are executable by the processor to cause the apparatus to,
load a first application with known behavior into a controlled execution environment;
import a software package into the first application;
based on execution of the loaded first application with the imported software package, determine one or more behaviors that are attributable to the software package based on identification of deviations in behavior from the known behavior,
wherein the instructions to determine the one or more behaviors comprise instructions to evaluate of behavior patterns recorded during execution of the first application with the software package associated based on first criteria for detecting behavior deviations and determine that one or more of the behavior patterns satisfy respective ones of the first criteria;
compute a score indicative of trustworthiness of the software package based on the one or more behaviors attributable to the software package; and
based on evaluation of the score computed for the software package, determine that the software package is malicious.

15. The apparatus of claim 14 further comprising instructions executable by the processor to cause the apparatus to perform a static analysis of the first application having the software package imported, wherein the instructions executable by the processor to cause the apparatus to determine the one or more behaviors comprise instructions executable by the processor to cause the apparatus to determine at least a first the one or more behaviors based on results of the static analysis.

16. The apparatus of claim 14, wherein the instructions executable by the processor to cause the apparatus to evaluate the score comprise instructions executable by the processor to cause the apparatus to evaluate the score against a threshold, and wherein the instructions executable by the processor to cause the apparatus to determine that the software package is malicious comprise instructions executable by the processor to cause the apparatus to determine that the score satisfies the threshold.

17. The apparatus of claim 14, wherein the instructions executable by the processor to cause the apparatus to compute the score comprise instructions executable by the processor to cause the apparatus to determine scores assigned to each of the one or more behaviors and aggregate the scores assigned to each of the one or more behaviors.

18. The apparatus of claim 14 further comprising instructions executable by the processor to cause the apparatus to adjust the score based on a reputation multiplier, wherein the reputation multiplier is determined based on metadata of the software package.

19. The method of claim 4, further comprising determining a programming language associated with the software package, wherein importing the software package based on the type of the software package comprises importing the software package based on the programming language associated with the package.

20. The non-transitory computer-readable media of claim 10, wherein the instructions to associate the software package with the first application comprise instructions to determine a type of the software package and import or include the software package in the first application based on the type of the software package.

* * * * *